United States Patent [19]

Preston

[11] Patent Number: 4,528,167

[45] Date of Patent: Jul. 9, 1985

[54] SELECTIVE SOLVENT EXTRACTION USING ORGANOPHOSPHORUS AND CARBOXYLIC ACIDS AND A NON-CHELATING ALDEHYDE OXIME

[75] Inventor: John S. Preston, Randburg, South Africa

[73] Assignee: Council for Mineral Technology, Randburg, South Africa

[21] Appl. No.: 523,029

[22] Filed: Aug. 15, 1983

Related U.S. Application Data

[63] Continuation of Ser. No. 380,348, May 20, 1982, abandoned.

[30] Foreign Application Priority Data

Nov. 3, 1981 [ZA] South Africa .................. 81/7583

[51] Int. Cl.³ .................. B01D 11/04; C01G 51/00; C01G 53/00
[52] U.S. Cl. .................. 423/139; 423/DIG. 14; 75/101 BE; 75/119; 210/638
[58] Field of Search ......... 423/24, 100, 139, DIG. 14; 210/638; 75/101 BE, 119

[56] References Cited

U.S. PATENT DOCUMENTS

3,666,446 5/1972 Cook .................. 423/139
3,872,209 3/1975 Hazen .................. 423/24
3,927,169 12/1975 Goren .................. 423/24
4,191,728 3/1980 Tels .................. 423/24

OTHER PUBLICATIONS

Ashbrook, *Coordination Chemistry Reviews* (16), 1975, pp. 285–307.
Masui, Masaichiro and Hotta Keiko, "Extraction of Cu(II) with Butyraldoxime and its Colorimetry", Busenki Kagaku 11(11), 1138–1140, (1964), Japan, abstracted in Analytical Chemistry, vol. 12, 1965, 4593f.

*Primary Examiner*—John Doll
*Assistant Examiner*—Robert L. Stoll
*Attorney, Agent, or Firm*—Finnegan, Henderson, Farabow, Garrett & Dunner

[57] ABSTRACT

A process for the extraction of metal values, in particular divalent metal ions such as copper, nickel, zinc, cobalt and manganese from aqueous solutions thereof which may be well in the acid range for example of pH 2 to 4. Extraction is effected using known organophosphorus or carboxylic acid extractants but in combination with non-chelating oximes, preferably of aldehydes wherein the alpha-carbon atom is primary or secondary. A synergistic effect between the extractant and oxime enables extraction to take place at a lower pH than heretofore thereby saving in acid and neutralizing agents in many instances.

8 Claims, 2 Drawing Figures

SELECTIVE SOLVENT EXTRACTION USING ORGANOPHOSPHORUS AND CARBOXYLIC ACIDS AND A NON-CHELATING ALDEHYDE OXIME

This application is a continuation, of application Ser. No. 380,348, filed May 20, 1982 now abandoned.

BACKGROUND TO THE INVENTION

This invention relates to selective solvent extraction using organophosphorus and carboxylic acids as the metal extractants in the presence of additives which greatly enhance the utility of extractants under certain conditions.

It is often desirable to remove, and possibly recover, metals which are dissolved in a leaching step in hydrometallurgical processes. Metals which are often to be removed and recovered include cobalt, nickel, copper, zinc and manganese which are all amenable to removal by use of a solvent extractant.

However, as a result of the fact that leach liquors containing these metals usually result from a leach using acid, the pH of the leach liquor is generally rather low. Conventional solvent extractants such as organophosphorus and carboxylic acids only operate effectively at appreciably higher pH and thus, either extremely poor performance must be tolerated, or the leach liquor must be at least partly neutralized thereby consuming both acid and alkali in order to achieve this. Once at least partially neutralized, the organophosphorus i.e. organophosphoric, organophosphonic and organophosphinic, and carboxylic acids operate effectively as solvent extractants. Usually, however, such a procedure is not favoured as it is uneconomical and it would be most desirable to provide a process for the extraction of such metals at a substantially lower pH than is at present possible.

It is known, and has been practiced, to employ di-(2-ethylhexyl)phosphoric acid at very mildly acidic pH. The phosphonic acid equivalent has also been employed with somewhat greater success and a phosphinic acid reagent has recently become available. The abovementioned phosphoric acid has also been used together with chelating additives in the form of the commonly known hydroxyoxime sold under the Registered trade mark LIX63 by Henkel Corporation for separating copper and cobalt from nickel in sulphate streams. This process did not proceed, as far as Applicant is aware, beyond the pilot plant scale.

It is to be observed in connection with existing extraction processes, that cobalt is generally extracted at a lower pH value than is nickel.

BRIEF SUMMARY OF THE INVENTION

It has now surprisingly been found that an unforeseen extremely marked synergistic effect is obtained when there is used, together with an organo-phosphorus acid and any carboxylic acids having required extraction characteristics, a non-chelating oxime. This synergistic effect enables the metals to be extracted at substantially lower pH levels than was possible heretofore.

Accordingly this invention provides a process for the solvent extraction of metal values from solutions containing such metals comprising the contacting of a pregnant solution with a solvent extractant being an organophosphorus acid or a carboxylic acid capable of extracting desired metal values, the extraction being characterised by the fact that it takes place in the presence of a non-chelating oxime selected to enhance extraction of the desired metal values.

Further features of the invention provide for the oxime to be selected to enable extraction to take place at a lower pH than was practical heretofore; for the extractant to be organophosphoric acid of the type $(RO)_2$-PO—OH where each R is, independently of the other, a substituted or unsubstituted alkyl, aryl, or alkaryl group; for the extracted metals to be cobalt, nickel, manganese, copper and zinc; for the extraction, in the case of organophosphoric acids to be carried out in the pH range of from 0 to 5, and in the case of carboxylic acids in the pH range of from 1 to 5, and for the contact time to be of the order of a few minutes.

The fact that a synergistic effect is created by employing non-chelating oximes together with the organophosphorus or carboxylic acids is evidenced by the fact that, in the case of cobalt and nickel, the order of extraction is entirely reversed so that the selectivity for cobalt over nickel is reversed. Also the extracted species are different: in the case of di-(2-ethylhexyl)phosphoric acid with 2-ethylhexanal oxime the cobalt is extracted as the bright pink octahedral complex as opposed to the dark blue tetrahedral complex whilst the nickel is extracted as the turquoise as opposed to the apple-green octahedral complex in which the oxygen-donor ligands have been replaced by nitrogen-donor ligands.

Not only does the present invention provide for extraction of metal values from solutions at a substantially lower pH than was heretofore possible, but the extraction takes place extremely quickly (of the order of a few minutes, as opposed to some hours in the case of a carboxylic acid and chelating oxime such as LIX 63 mixture) and, in addition, stripping of the extracted values from the solvent extractant has proved to be extremely simple. One reason for this is the avoidance of the formation of intractable cobalt (III) chelate complexes which are not amenable to conventional stripping techniques. Thus, stripping can be effected simply by using dilute mineral acid solutions for example 20 to 200 g/l sulphuric acid.

Also, some mixtures, for example 2-bromo octanoic acid mixed with 2-ethylhexanal oxime show useful separations of nickel which is extracted at pH 2 to 3 from cobalt which is extracted at pH 3 to 4 as opposed to the non-selective extraction of both metals together at a pH of 4 to 5 in the case of the carboxylic acid alone.

Preferably, the oximes employed in the implementation of the invention are those of aldehydes having the alpha-carbon as a primary or secondary one. Other oximes show similar synergistic effects.

It will be understood that the organophosphorus acids which can be used to extract cobalt, nickel, manganese and copper in the pH range from 0 to 2 enables these metals to be recovered directly from acid leach liquors without the necessity of partially or totally neutralizing the residual acid concentration of the leach liquors. This represents a substantial saving of both acid and neutralizing agents.

DETAILED DESCRIPTION OF VARIOUS EMBODIMENTS OF THE INVENTION

Initial Tests

In order to investigate and confirm the operation of the invention initial tests were carried out under fixed conditions in order to determine the pH at which 50 percent extraction would take place (pH 0,5) in the case of nickel and cobalt. These results are given in the Table below with each result having been obtained by investigating the extraction of cobalt and nickel by 0,5M organophosphorus acid in xylene at 20° C. In each case where an additive was added the extent of addition was also 0,50M. In each case the aqueous solutions contained 0,10M cobalt (II) and/or 0,10M nickel as the nitrate in 1,00M ammonium nitrate solution. The organophosphoric, organophosphonic and organophosphinic acids were investigated, the latter two being commercially available reagents RD 577 marketed by Shell Chemicals and Cyanex CNX marketed by the American Cyanamid Company in the case of the phosphonic and phosphinic acid reagents respectively.

| Extractant | Additive+ | $pH_{0,5}$ Co | $pH_{0,5}$ Ni | $pH_{0,5}$ Ni—Co | $\Delta pH_{0,5}^{++}$ Co | $\Delta pH_{0,5}^{++}$ Ni |
|---|---|---|---|---|---|---|
| Di-(2-ethyl- | None | 3,68 | 4,11 | 0,43 | 0,00 | 0,00 |
| hexyl)Phos- | TBP | 3,82 | 4,07 | 0,25 | −0,14 | 0,04 |
| phoric Acid | isodecanol | 3,65 | 3,86 | 0,21 | 0,03 | 0,25 |
| (D2EHPA) | nonyl-phenol | 3,70 | 3,91 | 0,21 | −0,02 | 0,20 |
|  | TOPO | 3,90 | 4,10 | 0,20 | −0,22 | 0,01 |
|  | LIX63 | 0,12 | ND* | ND | 3,56 | ND |
|  | EHO | 1,99 | 1,58 | −0,41 | 1,69 | 2,53 |
| RD577 | None | 3,90 | 5,12 | 1,22 | 0,00 | 0,00 |
|  | TBP | 3,99 | 4,98 | 0,99 | −0,09 | 0,14 |
|  | isodecanol | 4,12 | 4,77 | 0,65 | −0,22 | 0,35 |
|  | EHO | 3,25 | 3,06 | −0,19 | 0,65 | 2,06 |
| CNX | None** | 4,22 | 5,20 | 0,98 | 0,00 | 0,00 |
|  | EHO** | 4,22 | 4,58 | 0,36 | 0,00 | 0,62 |

+TBP = Tri-n-butyl phosphate; TOPO = tri-n-octylphosphine oxide; EHO = 2-ethylhexanal oxime
++$\Delta pH_{0,5}$ = $pH_{0,5}$ without additive - $pH_{0,5}$ with additive
*not determined due to extremely slow extraction rate of nickel
**solutions include 25 volume % isodecanol It will be noted that only small influences on the $pH_{0,5}$ were obtained in all cases apart from those in which 2-ethylhexanal oxime and LIX63 were employed. Whilst a vast improvement was obtained in the case of LIX63 with the organophosphoric acid in respect of cobalt, the extraction of nickel was too slow to be of any practical use and thus, at the best, this additive could be employed for separating cobalt from nickel. However, it must be borne in mind that extraction of cobalt even is slow and also stripping thereof from the reagent is extremely difficult.

In all other cases nickel pH recovery is substantially improved and an examination of the pH figures given in the cobalt and nickel columns shows that the oxime additive has by far the most desirable effect at lowering the pH value at which extraction takes place. This is, of course, with the exception of LIX63 the disadvantages of which are discussed above.

Figure 1:
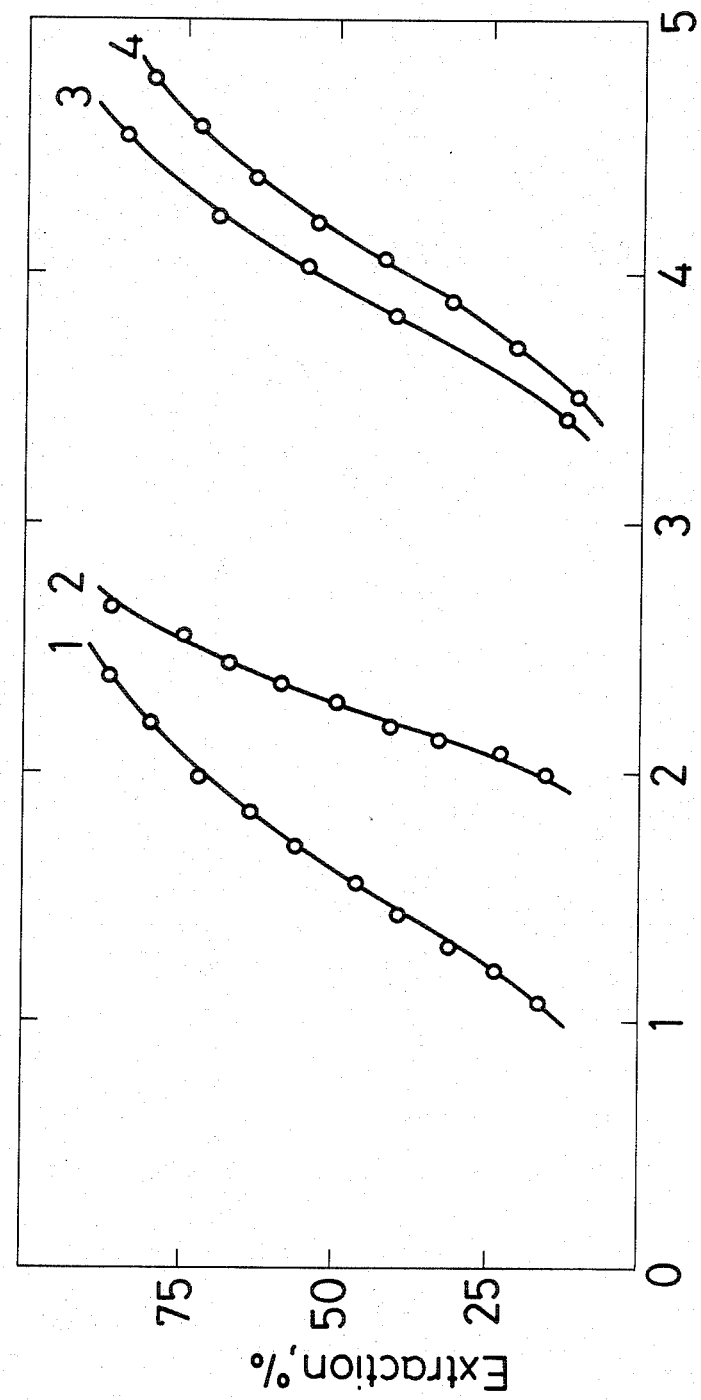
FIG. 1 is a series of graphs showing percentage extraction vs pH for four different extractant systems and, FIG. 2 is a schematic flow sheet of a continuous counter current extraction process.

The pH extraction curves were plotted for various systems and exemplary curves are illustrated in FIG. 1. In FIG. 1 the curve numbered 1 is that of the synergistic mixture of 0,5M Di-(2-ethylhexyl)phosphoric acid and 0,5M 2-ethylhexanal oxime.

Curve numbered 2 is that of 0,5M RD573 (a commercially available chelating di-oxime made by Shell Chemicals) and only approaches the performance of the synergistic mixture of the invention. This chelating di-oxime has the disadvantage indicated above in that intractible cobalt complexes will arise unless a high selectivity over cobalt is exhibited.

Curve numbered 3 is that of 0,5M LIX65N (a variant of LIX63 and also made by Henkel Corporation).

Curve numbered 4 is that of 0,5M Di-(2-ethylhexyl)-phosphoric acid itself.

The curves were obtained using an aqueous phase of 0,1M $Ni(NO_3)_2$ in 1,0M $NH_4NO_3$ and the organic solvent was xylene. The temperature was 20° C., aqueous to organic ratio 1:1 and the contact time 10 minutes except in the use of LIX65N where the contact time was 60 minutes.

The superiority of the synergistic mixture of the invention is quite obvious from the curves which show that extraction takes place over the range of about pH 1 to pH 2, for the mixture.

Different Oximes

Tests were conducted to show that different oximes of the non-chelating type exhibited the same synergistic effect. In these tests the $pH_{0,5}$ was again determined from the same 0,1M nitrate solutions employed in the previous tests. The aqueous to organic ratio was 1:1 and the organic phase was a 0,5M solution of oxime plus 0,5M Di-(2-ethylhexyl)phosphoric acid. The temperature was 20° C.

The oximes employed were all of the non-chelating type having the general formula RR'CNOH in which R and R' had the meanings set out in the following Table 2:

TABLE 2

Extraction of nickel and cobalt by mixtures of Di-(2-ethylhexyl) phosphoric acid and non-chelating oximes, RR'CNOH

| R | R' | $pH_{0,5}$ Ni | $pH_{0,5}$ Co | $pH_{0,5}$ Co—Ni | $\Delta pH_{0,5}$ Ni | $\Delta pH_{0,5}$ C. |
|---|---|---|---|---|---|---|
| $C_7H_{15}$ | H | 1,34 | 1,72 | 0,38 | 2,77 | 1,96 |
| $C_4H_9CH(C_2H_5)$ | H | 1,58 | 1,99 | 0,41 | 2,53 | 1,69 |
| $C_2H_5CH(C_2H_5)$ | H | 1,73 | 2,13 | 0,40 | 2,38 | 1,55 |
| $C_6H_5$ | H | 3,41 | 3,25 | −0,16 | 0,70 | 0,43 |
| $(CH_3)_3C$ | H | 3,46 | 3,50 | 0,04 | 0,65 | 0,18 |
| $C_6H_{13}$ | $CH_3$ | 3,80 | 3,49 | −0,31 | 0,31 | 0,19 |
| $C_5H_{11}$ | $C_2H_5$ | 3,94 | 3,59 | −0,35 | 0,17 | 0,09 |
| $C_6H_5$ | $CH_3$ | 4,03 | 3,71 | −0,32 | 0,08 | −0,03 |
| $(CH_3)_2CH$ | $(CH_3)_2CH$ | 4,15 | 3,77 | −0,38 | −0,04 | −0,09 |

Useful synergistic effects (i.e., large $\Delta pH_{0,5}$ values) are shown for the oximes of aldehydes where the alpha-carbon is primary or secondary. Other oximes (namely those of aldehydes where the alpha-carbon is tertiary, aromatic aldehydes, and aliphatic or aromatic ketones) show very much smaller synergistic effects. Note that a positive value in the column headed $pH_{0,5}$ (Co-Ni) indicates that the mixture is selective for nickel over cobalt, whilst a negative value indicates selectivity for cobalt over nickel.

Different Organophosphoric Acids

Tests were conducted under the same conditions as for the preceeding set of tests but with different organophosphoric acids and 2-ethylhexanal oxime as the non-chelating oxime. The different acids used were those having the following formulae:

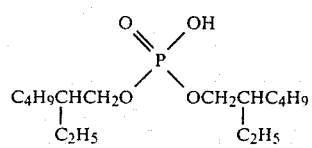

Acid No. (Ia)

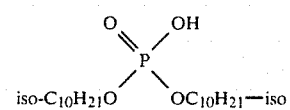

Acid No. (Ib)

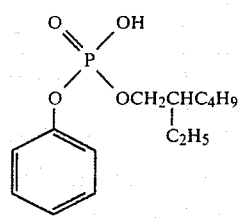

Acid No. (Ic)

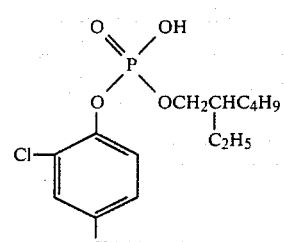

Acid No. (Id)

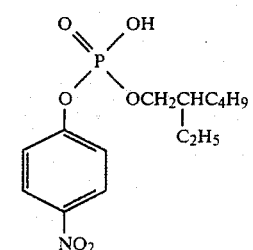

Acid No. (Ie)

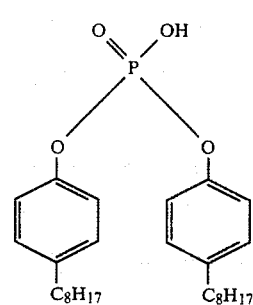

Acid No. (If)

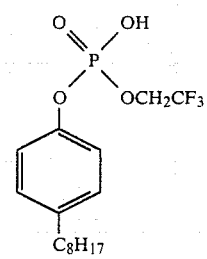

Acid No. (Ig)

The results are set forth in the following Table 3:

TABLE 3

Extraction of nickel and cobalt by mixtures of organo-phosphoric acids and 2-ethylhexanal oxime.

| Organo-phosphoric Acid | $pH_{0,5}$ for acid alone | | | $pH_{0,5}$ for acid plus oxime | | | $\Delta pH_{0,5}$ | |
|---|---|---|---|---|---|---|---|---|
| | Ni | Co | Ni—Co | Ni | Co | Co—Ni | Ni | Co |
| Ia | 4,11 | 3,68 | 0,43 | 1,58 | 1,99 | 0,41 | 2,53 | 1,69 |
| Ib | 3,72 | 3,42 | 0,30 | 1,30 | 1,70 | 0,40 | 2,42 | 1,72 |
| Ic | 2,92 | 2,85 | 0,07 | 0,84 | 1,23 | 0,39 | 2,08 | 1,62 |
| Id | 2,71 | 2,50 | 0,21 | 0,66 | 0,98 | 0,32 | 2,05 | 1,52 |
| Ie | 2,30 | 2,30 | 0,00 | 0,81 | 1,18 | 0,37 | 1,49 | 1,12 |
| If | 2,63 | 2,53 | 0,10 | 0,42 | 0,79 | 0,37 | 2,21 | 1,74 |

$\Delta pH_{0,5}$ = $pH_{0,5}$ for acid alone - $pH_{0,5}$ for acid plus oxime.

These results show that by varying the molecular structure of the organophosphoric acid, in particular by introducing aromatic functions, extraction of cobalt and nickel can be carried out under remarkably acidic conditions and that extractant mixtures can be formulated for the relevant circumstances.

It is to be noted that the selectivity of the organophosphoric acids alone for cobalt over nickel (column 4) becomes one of nickel over cobalt for the mixed extractants (column 7).

Different Carboxylic Acids

Tests were conducted on carboxylic acids with 0,5M carboxylic acid (1,0M for Versatic 10) plus, where applicable, 0,5M non-chelating oxime in xylene (one result labelled used heptane as the diluent). The aqueous phase contained 0,1M Ni(NO₃)₂ or 0,1M Co(NO₃)₂ in 1,0N NH₄NO₃. Contact was made at aqueous to organic ratio of 1:1.

The results obtained are reflected below:

TABLE 4

Extraction of nickel and cobalt by mixtures of carboxylic acids and non-chelating oximes.

| Carboxylic acid | Non-chelating oxime+ | $pH_{0,5}$ | | | $\Delta pH_{0,5}$ | |
|---|---|---|---|---|---|---|
| | | Ni | Co | Co—Ni | Ni | Co |
| Versatic 10 | None | 5,98 | 6,16 | 0,18 | 0,00 | 0,00 |
| Versatic 10 | CAO | 4,22 | 5,01 | 0,79 | 1,76 | 1,15 |
| Versatic 10 | EHO | 4,66 | 5,28 | 0,62 | 1,32 | 0,88 |
| 2-bromolauric | None | 4,68 | 4,70 | 0,02 | 0,00 | 0,00 |
| | EHO | 2,56 | 3,47 | 0,91 | 2,12 | 1,23 |
| 2-bromo-caprylic | CAO | 2,34 | 3,30 | 0,96 | ND | ND |
| | EHO | 2,42 | 3,61 | 1,19 | ND | ND |
| | EHO | 1,96 | 3,20 | 1,24 | ND | ND |
| | EBO | 2,70 | 3,70 | 1,00 | ND | ND |

+CAO, caprylaldehyde oxime; EHO, 2-ethylhexanal oxime; and EBO, 2-ethylbutanal oxime.

Versatic 10 is a highly branched carboxylic acid produced by Shell Chemicals.

Although mixtures of carboxylic acids and non-chelating oximes do not permit extraction of cobalt and nickel under as acidic a condition as mixtures of organophosphoric acids and non-chelating oximes, the nickel-over-cobalt selectivity of the former mixtures (column 5) are significantly higher than the latter (column 7 in Table 2) and the required pH is certainly lower.

Effects on Different Cations

Tests were carried out on numerous different cations, generally metal ions, in order to ascertain the effect of the non-chelating oxime. The tests were conducted, as before, by determining the $pH_{0,5}$ in each case. All cations were present as nitrates in 1M HNO₃ and the pH was adjusted using concentrated ammonia solution. The exceptions to the above were the ferrous $Fe^{2+}$ ion which was in the sulphate form in $HNO_3$ initially and the $Cr^{2+}$ and $VO^{2+}$ cations which were in the sulphate form in 0,33M $H_2SO_4$ the pH of which was adjusted using NaOH.

The extractant was 0,5M Di-(2-ethylhexyl)phosphoric acid (D2EHPA) and 0,5M2EHPA in admixture with 0,5M 2-ethylhexanal oxime in xylene in each case and at 20° C. Contact took place at an aqueous to organic ratio of 1:1.

The results of the tests are reflected in Table 5 below:

| Metal | $pH_{0,5}$(D2EHPA) | $pH_{0,5}$(D2EHPA-EHO) | $\Delta pH_{0,5}$ |
|---|---|---|---|
| $Ni^{2+}$ | 4,12 | 1,60 | 2,52 |
| $Cu^{2+}$ | 2,90 | 1,05 | 1,85 |
| $Co^{2+}$ | 3,70 | 2,00 | 1,70 |
| $Fe^{2+}$ | 3,56 | 2,10 | 1,46 |
| $Mn^{2+}$ | 2,90 | 2,12 | 0,78 |
| $Cr^{2+}$ | 2,15 | 1,47 | 0,68 |
| $VO^{2+}$ | 1,25 | 0,96 | 0,29 |
| $Fe^{3+}$ | −0,32 | −0,40 | 0,08 |
| $Cr^{3+}$ | 3,12 | 2,98 | 0,14 |
| $La^{3+}$ | 1,96 | 2,06 | −0,10 |
| $Mg^{2+}$ | 3,81 | 3,69 | 0,12 |
| $Ca^{2+}$ | 2,85 | 2,97 | −0,12 |
| $Zn^{2+}$ | 1,42 | 1,58 | −0,16 |
| $Cd^{2+}$ | 2,98 | 1,48 | 1,50 |
| $Ag^+$ | 3,25 | <0,00 | >3,25 |
| $Pb^{2+}$ | 2,50 | 2,33 | 0,17 |
| $NH_4^+$ | 3,57* | 3,37* | 0,20 |

$\Delta pH_{0,5} = pH_{0,5}$ (D2EHPA) - $pH_{0,5}$ (D2EHPA-EHO)
*pH at which the $NH_4^+$ concentration in the organic phase reaches 0,05 M.

Appreciable synergistic effects are shown by all the diavelent transition metal ions studied (note that $VO^{2+}$, however, has only one "vacant" coordination site once complexed with D2EHPA, in contrast to two for the other divalent metal ions). There is no synergistic effect for trivalent ions. Amongst the non-transition metals, only silver and cadmium show significant synergistic effects. The implications for extraction of the divalent transition metals without co-extraction of gangue metals (magnesium, calcium, etc) or neutralization products (e.g. ammonium ion) are clear.

Continuous Counter-Current Extraction

Figure 2:
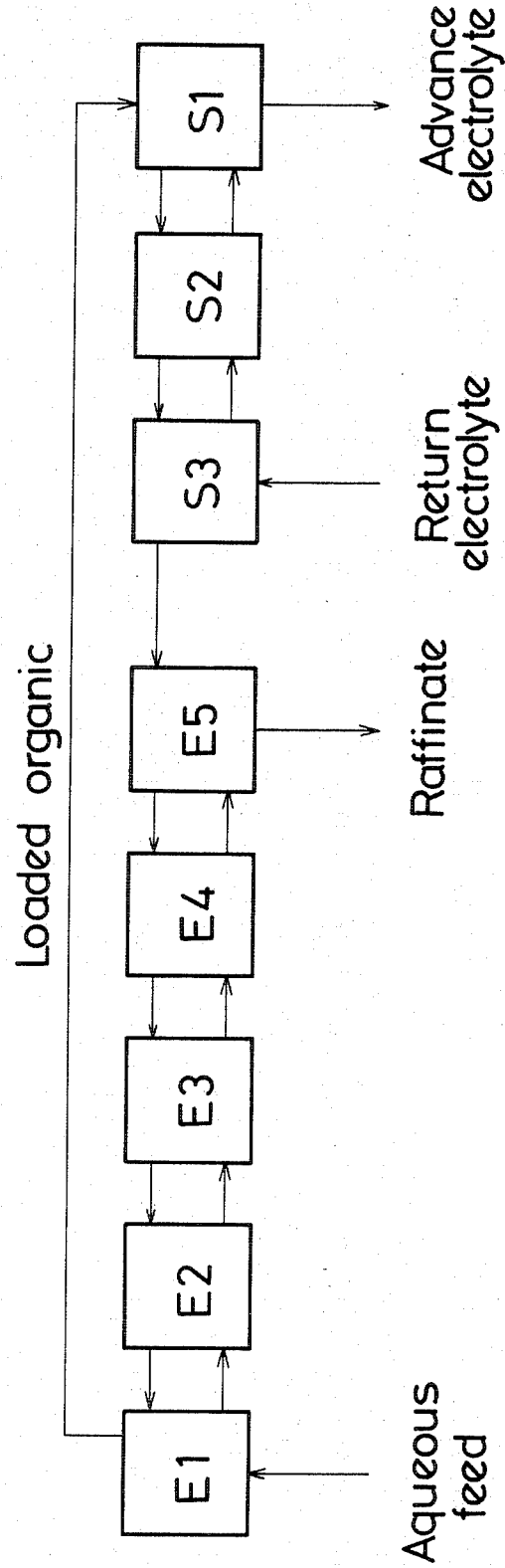

Based on information collected a counter current type of extraction process was tested using a Bell-Engineering mixer-settler apparatus. The test extraction was that of nickel as it showed excellent sensitivity to the non-chelating oxime synergistic effect. The test work which will not be described in detail herein resulted in good extractions of Ni taking place over five extraction stages E1 through E5 as shown in FIG. 2. Three stripping stages are employed.

Typical operating conditions were found to be as indicated below in the case of use with and without the oxime. The system tested had organic phases consisting of 15% D2EHPA and 15% D2EHPA together with 5% EHO in Solvesso 150 as solvent. (Solvesso is an aromatic type of solvent sold under Trade Mark "Solvesso 150" by Esso Chemicals.

The organic to aqueous ratio was 2.6:1 to give the conditions described below and a residence time of 2,75 minutes was allowed in each mixer. The conditions were then as shown in Table 6:

TABLE 6

| System | Extraction pH | Nickel in raffinate $gl^{-1}$ | $NH_3$ in loaded organic phase $gl^{-1}$ |
|---|---|---|---|
| 15% D2EHPA | 4,4–4,5 | 0,04 | 1,09 |
| 15% D2EHPA 5% EHO | 2,8–3,2 | 0,02 | 0,024 |

TABLE 7

|  | D2EHPA (%) | D2EHPA-EHO (%) |
|---|---|---|
| Ammonia for pH adjustment during extraction | 125–133 | 85–98 |
| Acid make-up for return electrolyte | 25–33 | 16 |
| Sodium hydroxide for pH adjustment of advance electrolyte | <1 | 5 |
| Total acid - base requirement | 150–167 | 106–119 |

The improvement as a result of the invention is thus, to say the least, appreciable.

The invention therefore provides a simple yet effective process for the extraction of metal values by means of organophosphorus and carboxylic acids in combination with non-chelating oximes.

What I claim as new and desire to secure by Letters Patent is:

1. A process for the solvent extraction of nickel, selectively from cobalt from solutions containing such metals and having a pH of less than 5 comprising contacting said solution with a solvent extractant comprising an organophosphorus acid or a carboxylic acid capable of extracting the nickel and a non-chelating oxime of an aldehyde wherein the alpha carbon atom is primary or secondary.

2. The process of claim 1 in which the extraction is carried out at a pH of less than 4.

3. The process of claim 1 in which the organophosphorus acid has the formula $(RO)_2PO-OH$ wherein each R is, independently of the other, a substituted or unsubstituted alkyl, aryl or alkaryl group.

4. The process of claim 1 in which the non-chelating oxime has the formula:

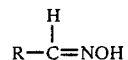

wherein R is selected from the group consisting of $C_7H_{15}$; $C_4H_9CH(C_2H_5)$; and $C_2H_5CH(C_2H_5)$.

5. The process of claim 4 wherein the non-chelating oxime is 2-ethylhexanal oxime.

6. The process of claim 4 wherein the non-chelating oxime is caprylaldehyde oxime.

7. A process for the solvent extraction of nickel selectively from cobalt from solutions containing such metals and having a pH of less than 4 comprising contacting said solution with a solvent extractant comprising an organophosphorus acid or a carboxylic acid capable of extracting the nickel and a non-chelating oxime of an aldehyde having the formula:

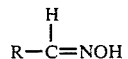

wherein R is selected from the group consisting of $C_7H_{15}$; $C_4H_9CH(C_2H_5)$; and $C_2H_5CH(C_2H_5)$.

8. The process of claim 7 wherein the oxime is 2-ethylhexanal oxime.

* * * * *